United States Patent
Imamura et al.

(10) Patent No.: US 6,284,120 B1
(45) Date of Patent: Sep. 4, 2001

(54) METHOD OF ELECTROPLATING AND ELECTRODEPOSIT STRUCTURE

(75) Inventors: Takahiro Imamura; Masaki Katayama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/350,021

(22) Filed: Jul. 9, 1999

(30) Foreign Application Priority Data

Feb. 4, 1999 (JP) .................................................. 11-027408

(51) Int. Cl.[7] ............................... C25D 7/00; C25D 1/00; B41M 5/20; H01M 4/02
(52) U.S. Cl. ................................................. 205/50; 205/78
(58) Field of Search ............................... 205/68, 78, 112, 205/122, 50

(56) References Cited

U.S. PATENT DOCUMENTS

| | | | |
|---|---|---|---|
| 5,403,680 | * 4/1995 | Otagawa et al. | 429/123 |
| 5,815,347 | * 9/1998 | Pattanaik | 360/104 |
| 5,843,537 | * 12/1998 | Kim et al. | 427/504 |
| 5,936,813 | * 8/1999 | Kim et al. | 360/113 |
| 6,105,238 | * 8/2000 | Chestnut et al. | 29/603.14 |

FOREIGN PATENT DOCUMENTS

| 8124445 | 5/1996 | (JP) . |
|---|---|---|
| 9081924 | 3/1997 | (JP) . |

* cited by examiner

Primary Examiner—Bruce F. Bell
Assistant Examiner—Erica Smith-Hicks
(74) Attorney, Agent, or Firm—Greer, Burns & Crain, Ltd.

(57) ABSTRACT

A method of electroplating using a photoresist layer on a conductive seed layer. The photoresist layer defines a column-shaped space. Ridges are formed on the wall surfaces of the photoresist layer surrounding the column-shaped space. The ridges extend from the conductive seed layer to the opening of the column-shaped space. The electrolytic solution drives bubbles out of the column-shaped space, so that the column-shaped space is filled with the electrolytic solution without any cavities. In addition, if hydrogen bubbles are generated in the column-shaped space, the electrolytic solution serves to drive the hydrogen bubbles out of the column-shaped space along the corners of the column-shaped space.

7 Claims, 3 Drawing Sheets

METHOD OF ELECTROPLATING AND ELECTRODEPOSIT STRUCTURE

BACKGROUND OF THE INVENTION

1. Field of the Invention

The present invention relates to a method of electroplating capable of forming a column-shaped electrodeposit structure by using a photoresist over a seed layer, such as a conductive metal layer.

2. Description of the Prior Art

Electrodeposition or electroplating is one of the key technologies in the field of micromachining. A method of electroplating comprises a step of supplying electric current to a seed layer of conductive metal material in an electrolytic solution, so as to allow an electrodeposit to grow over the seed layer. When a predetermined pattern is defined on the seed layer by using a photoresist layer, for example, before the supply of electric current, an electrodeposit structure is allowed to grow over the seed layer at the exposed surface surrounded by the photoresist layer. The electrodeposit structure can be shaped into the predetermined pattern.

For example, when a column-shaped electrodeposit structure is intentionally formed by electroplating, a photoresist layer serves to define a column-shaped space by its wall surfaces upright to the seed layer. However, the column-shaped space hardly allows the electrolytic solution to enter the space, so that a bubble or bubbles tends to remain in the space. In addition, gas such as hydrogen generated in the electrolytic solution during supply of electric current cannot smoothly get out of the column-shaped space, either. Accordingly, the electrodeposit structure sometimes cannot grow enough over the seed layer within the column-shaped space because of interruption of the bubbles.

SUMMARY OF THE INVENTION

It is accordingly an object of the present invention to provide a method of electroplating capable of allowing bubbles to smoothly get out of a column space surrounded by a photoresist layer.

According to the present invention, there is provided a method of electroplating, using a photoresist layer on a seed layer so as to form: a wall surface surrounding a column space standing on the seed layer; and at least a ridge on the wall surface extending from the seed layer toward an opening of the column space.

It has been confirmed that such a ridge serves to allow the electrolytic solution to be smoothly introduced into the column space, so that bubbles in the column space can be easily driven out of the column space during the method of electroplating. An electrodeposit structure reliably grows within the column space all over the exposed surface of the conductive seed layer. The electrodeposit structure can be reliably shaped into a full column shape without any cavity or crack.

In this case, the electrodeposit structure may comprise a column body standing on the conductive seed layer, and at least a stripe of recession formed on a peripheral surface of the column body so as to extend from the conductive seed layer to the upper end of the peripheral surface. The conductive layer may be made from metal material.

The ridge may include an edge extending from the conductive seed layer to the opening of the column space. The edge serves to reduce the contact area between the ridge and bubble, so that the bubble can be easily driven out of the column space. The edge may be a ridge of an obtuse angle or a ridge of an acute angle. An electrodeposit structure obtained through this method of electroplating may have the recession in the form of a notch.

The column space may be faced by ridges from four directions. Such disposition of the ridges may serve to form a column-shaped electrodeposit structure surrounded by four surface areas of the peripheral surface, for example. The obtained electrodeposit structure may have four recessions in respective surface areas of the column body.

In addition, if the wall surface and ridge at the photoresist layer extend in the direction vertical to the surface of the conductive seed layer, the column-shaped electrodeposit structure may be obtained to stand upright to the conductive seed layer. The obtained electrodeposit structure may have the peripheral surface and recession upright to the surface of the conductive seed layer.

In particular, the column space of the aspect ratio greater than 1 hardly allows the electrolytic solution to be introduced into the space so as to drive bubbles out of the space. The method of electroplating according to the present invention may be most useful in this situation. Here, the aspect ratio represents the ratio of H/d where H is the height of the column space and d is the width of the wall surface. The obtained electrodeposit structure may have a column-shaped body of the aspect ratio greater than 1.

The aforementioned method of electroplating may be used to manufacture a head slider for a disk drive unit, comprising a medium-opposing surface opposed to a surface of a recording medium, for example, and a column terminal standing on the medium-opposing surface. The head slider may be employed in a recording disk drive such as a magnetic recording disk drive. When the terminals are formed according to the aforementioned method of electroplating, at least a stripe of recession is formed on a peripheral surface of the column terminal so as to extend from the medium-opposing surface toward an upper end of the peripheral surface.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
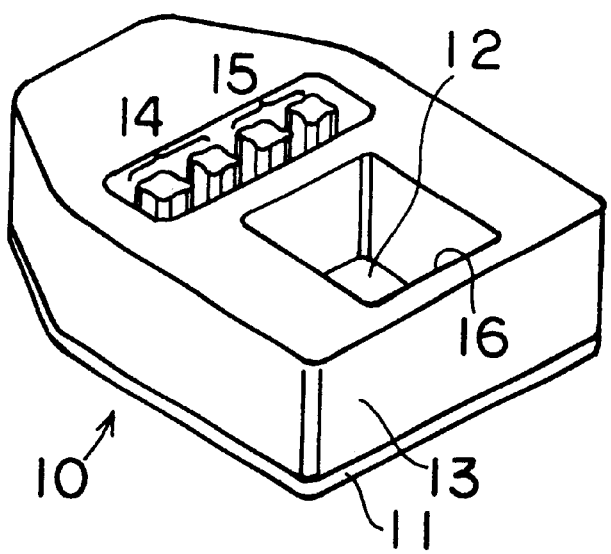
FIG. 1 is a perspective view illustrating a head slider employed in a magnetic disk drive unit.

FIG. 1 illustrates a head slider 10 employed in a magnetic recording disk drive such as a hard disk drive (HDD). The head slider 10 comprises a medium-opposing surface or air bearing surface (ABS) layer 11, made of $SiO_2$, opposed to the disk surface of a magnetic disk, not shown. A microactuator 12 is assembled in the ABS layer 11 so as to drive a magnetic head element or transducer, not shown, toward and away from the disk surface and to accomplish the fine positioning of the magnetic head element. The head slider 10 may, for example, be supported at the tip end of a carriage arm, not shown, capable of swinging around the pivot axis. The swinging movement of the carriage arm allows the head slider 10 to move in the radial direction of the magnetic disk.

A slider body layer 13 and two pair of terminals 14, 15, both made of Ni, are formed on an electrodeposit seed layer, such as a conductive metal layer, covered over the ABS layer 11. Each terminal 14, 15 is connected to the magnetic head element through a wire pattern formed on the surface of the ABS layer 11. When information is recorded on the magnetic disk, an electric current representing the information is supplied to the magnetic head element through the first pair of the terminals 14. When information is to be read, an electric current output from the magnetic head element appears at the second pair of the terminals 15. A large window 16 is defined in the slider body layer 13 to reach the microactuator 12.

Figure 2:
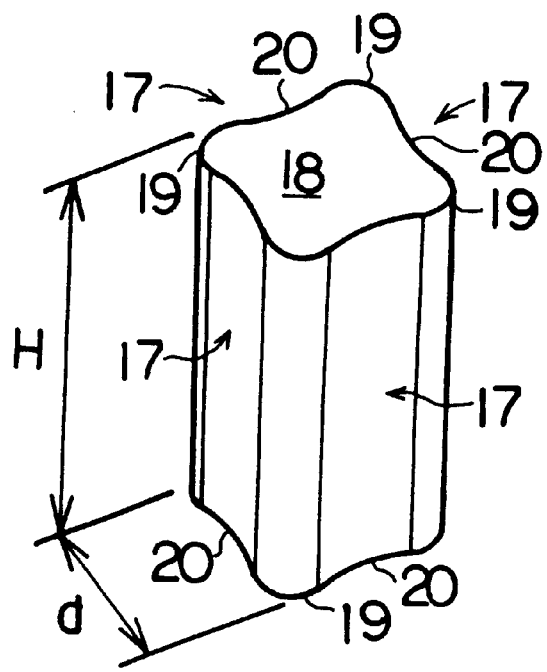
FIG. 2 is an enlarged perspective view illustrating a terminal according to an embodiment.

As is apparent from FIG. 2, each terminal 14, 15 comprises a column body 18 standing on the ABS layer 11. The column body 18 includes a peripheral surface comprising four surface areas 17. Each surface area 17 stands upright on the surface of the ABS layer 11. The column body 18 has an aspect ratio or H/d greater than 1, where d represents the width of the surface area 17 and H represents the height of the column body 18.

Adjacent surface areas 17 are connected to each other via a round edge 19 extending from the ABS layer 11 toward the upper end of the surface area 17. A stripe of recession 20 is formed on each of the surface areas 17 so as to extend, upright to the ABS layer 11, from the surface of the ABS layer 11 to the upper end of the corresponding surface area 17.

Figure 3:
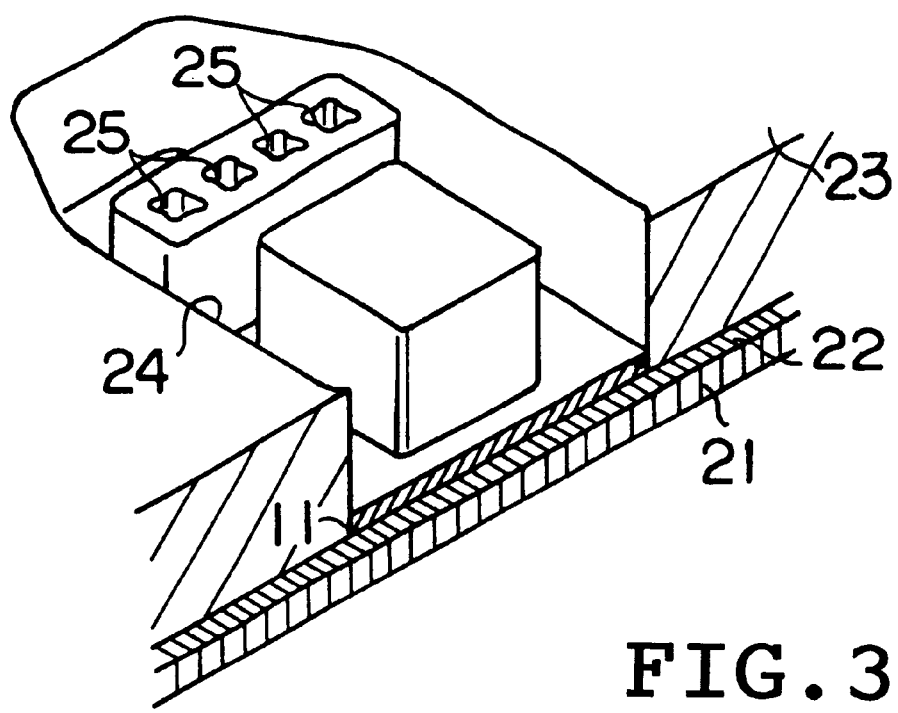
FIG. 3 is a perspective view illustrating the section of a photoresist layer formed on a seed layer.

Assume that the slider body layer 13 and terminals 14, 15 are formed by using a method of electroplating according to the present invention. As shown in FIG. 3, an aluminum separation layer 22 is formed on a wafer 21. The ABS layer 11 of $SiO_2$ and the electrodeposit seed layer are then formed on the aluminum separation layer 22 by sputtering or the like. A photoresist layer 23 is then formed on the electrodeposit seed layer all over the ABS layer 11. The photoresist layer 23 serves to define a first cavity 24 corresponding to the shape of the slider body layer 13 and second cavities 25 corresponding to the shapes of the terminals 14, 15. A plurality of sets of slider body layer 11 and terminals 14, 15 may be arranged on the single wafer 21.

The wafer 21 is subsequently bathed into an electrolytic solution including nickel ions. When electric current is supplied to the electrodeposit seed layer over the ABS layer 11, namely, the conductive seed layer, nickel ions in the electrolytic solution couple with electrons, so that electrodeposit structure is allowed to grow over the exposed surface of the conductive seed layer within the first and second cavities 24, 25. The first and second cavities 24, 25 are finally filled with the electrodeposit structures. These electrodeposit structures provide the slider body layer 13 and the terminals 14, 15. After the formation of the slider body 13 and the terminals 14, 15 has been completed, the wafer 21 is pulled up out of the electrolytic solution.

Thereafter, the photoresist layer 23 is removed from the wafer 21. After removal of the photoresist layer 23, the electrodeposit seed layer under the photoresist layer 23 is removed by an ion milling method or the like. A suspension is then attached to an electrodeposit structure within the cavity 24 by an adhesive or the like. The wafer 21 is thereafter bathed in a KOH solution. The aluminum separation layer 22 dissolves in the KOH solution so as to separate the wafer 21 and ABS layer 11 from each other. Each head slider 10 can be picked up from the wafer 21 without machining process.

Figure 4:
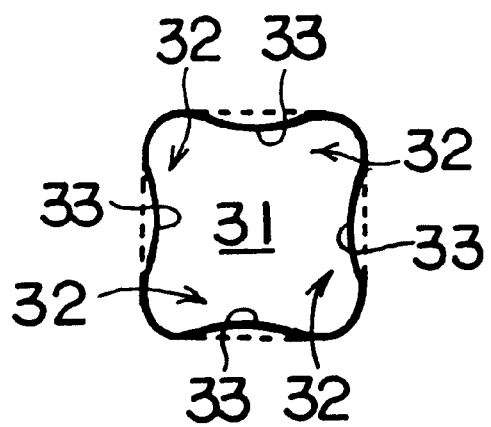
FIG. 4 is an enlarged plan view illustrating the photoresist layer.

As shown in FIG. 4, the photoresist layer 23 forms wall surfaces 32 standing upright to the surface of the conductive seed layer so as to surround a column space 31 from four directions, and four stripes of ridge 33 formed on the respective wall surfaces 32 so as to extend from the conductive seed layer toward the opening of the column space 31. Four wall surfaces 32 and ridges 33 cooperate to define the second cavity 25. It has been confirmed that employment of such photoresist layer 23 serves to accelerate the release of bubbles out of the column space 31 when the wafer 21 is bathed in the electrolytic solution. The electrolytic solution may fully spread every nook and cranny within the column space 31, so that the electrodeposit structures are reliably shaped. In addition, if hydrogen ions in the electrolytic solution couple with electrons so as to generate hydrogen bubbles within the column space 31, such hydrogen bubbles are driven out of the column space 31 by gradual growth of the electrodeposit structure along the corners of the column space 31. Accordingly, formation of voids or cracks is reliably prevented in the surface of the electrodeposit structure or the terminals 14, 15.

Figure 5:
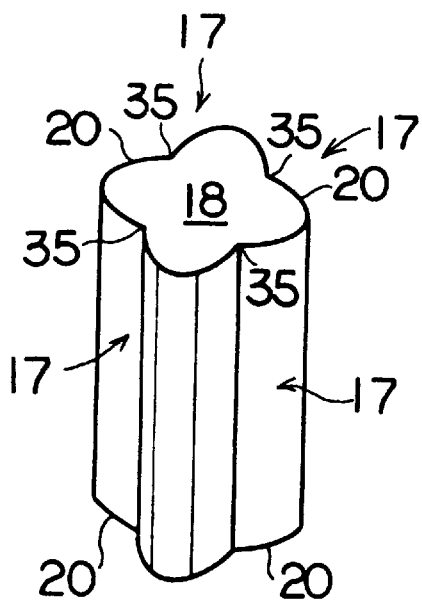
FIG. 5 is an enlarged perspective view illustrating a terminal according to another embodiment.
Figure 6:
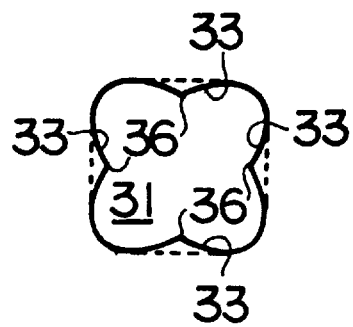
FIG. 6 is an enlarged plan view illustrating a photoresist layer used when the terminal of FIG. 5 is formed.
Figure 7:
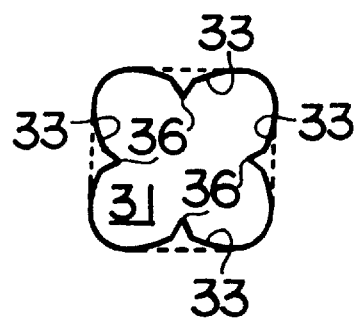
FIG. 7 is an enlarged plan view illustrating a photoresist layer used when the terminal of FIG. 5 is formed.

The recessions 20 on the terminals 14, 15 may, for example, be shaped as a notch 35 extending from the conductive seed layer to the upper end of the surface area 17 as shown in FIG. 5. Such notches 35 may be shaped, as shown in FIG. 6 for example, by the second cavity 25 comprising square edges 36 formed on the respective ridges 33 so as to extend from the surface of the conductive seed layer to the opening of the column space 31. It has been confirmed that the second cavity 25 with such square edges 36 serves to accelerate the release of bubbles out of the column space 31 when the wafer 21 is bathed in the electrolytic solution, and hydrogen bubbles generated in the column space 31 are smoothly driven out of the column space 31, in the same manner as described above. It should be noted that the square edge 36 on the ridge 33 may be not only a ridge of an obtuse angle, as shown in FIG. 6, but also a ridge of an acute angle, as shown in FIG. 7.

The above-described head slider 10 may include, in addition to two pairs of terminals 14, 15, two pairs of terminals for supplying drive signals or electric voltage to the microactuator 12, as described in detail in Japanese Patent Laid-open No. 9-81924, for example. However, the number of terminals is not limited to four or eight. The head slider 10 may also include terminals for ground (GND).

It should be noted that the above-described method of electroplating may be employed to form an electrodeposit structure of Cu, FeNi, and the like, in place of Ni. Moreover, such method of electroplating may be employed not only to form column-shaped terminals 14, 15 on the head slider 10 but also to form a column-shaped electrodeposit structure for other purposes.

What is claimed is:

1. A method of electroplating, comprising the step of:
using a photoresist layer on a seed layer so as to form:
   a wall surface surrounding a column space standing on the seed layer; and
   at least a ridge on the wall surface extending from the seed layer toward an opening of the column space.

2. An electrodeposit structure comprising:
a column body standing on a conductive layer; and
at least a stripe of recession formed on a peripheral surface of the column body so as to extend from the conductive layer toward an upper end of the peripheral surface.

3. The electrodeposit structure according to claim 2, wherein said conductive layer is made from metal material.

4. The electrodeposit structure according to claim 2, wherein said recession forms a notch.

5. The electrodeposit structure according to claim 2, wherein said peripheral surface comprises four surface areas standing from the conductive layer so as to define the recessions, respectively.

6. The electrodeposit structure according to claim 2, wherein said peripheral surface and recession extend in a vertical direction to the surface of the conductive layer.

7. The electrodeposit structure according to claim 2, wherein said column body has an aspect ratio greater than 1.

* * * * *